(12) United States Patent
Hiruma

(10) Patent No.: US 10,029,371 B2
(45) Date of Patent: Jul. 24, 2018

(54) ROBOT

(71) Applicant: JANOME SEWING MACHINE CO., LTD., Tokyo (JP)

(72) Inventor: Kenichiro Hiruma, Tachikawa (JP)

(73) Assignee: JANOME SEWING MACHINE CO. LTD., Tokyo (JP)

( * ) Notice: Subject to any disclaimer, the term of this patent is extended or adjusted under 35 U.S.C. 154(b) by 54 days.

(21) Appl. No.: 15/172,350

(22) Filed: Jun. 3, 2016

(65) Prior Publication Data
US 2016/0361818 A1 Dec. 15, 2016

(30) Foreign Application Priority Data

Jun. 11, 2015 (JP) ................. 2015-118736

(51) Int. Cl.
*B25J 9/18* (2006.01)
*B25J 9/16* (2006.01)
*B25J 9/10* (2006.01)

(52) U.S. Cl.
CPC .......... *B25J 9/1692* (2013.01); *B25J 9/1005* (2013.01); *B25J 9/1697* (2013.01); *G05B 2219/37555* (2013.01); *Y10S 901/09* (2013.01)

(58) Field of Classification Search
CPC . B25J 9/1692; B25J 9/1697; B25J 9/10; B25J 9/1005; G05B 2219/37555; Y10S 901/09
See application file for complete search history.

(56) References Cited

U.S. PATENT DOCUMENTS

| 2013/0073089 | A1 | 3/2013 | Nakahara |
| 2014/0330434 | A1* | 11/2014 | Nixon .................... B25J 9/1692 |
| | | | 700/254 |

FOREIGN PATENT DOCUMENTS

| CN | 102497937 A | 6/2012 |
| JP | 2014-210332 A | 11/2014 |
| JP | 2014-226730 A | 12/2014 |
| WO | 02/16091 A1 | 2/2002 |

OTHER PUBLICATIONS

Office Action dated Nov. 1, 2016 issued in corresponding Taiwan Application No. 105110428.

* cited by examiner

*Primary Examiner* — Spencer D Patton
(74) *Attorney, Agent, or Firm* — Nath, Goldberg & Meyer; Jerald L. Meyer

(57) ABSTRACT

A controller of a robot includes a storage that stores a main program, a point sequence containing statements arranged in sequence and containing kind information identifying control details to a work tool and coordinate information on a point on a work-piece, a point kind definition describing the control details identified by the kind information, and containing reference information to refer adjustment information for each work tool, and the adjustment information for each work tool prepared so as to correspond to the reference information, an executing unit executing the main program, and a referring unit referring the adjustment information based on the reference information when the point kind definition in the point sequence is inherited during the execution by the executing unit, and applying the adjustment information to the control details.

8 Claims, 16 Drawing Sheets

| | POINT SEQUENCE | | | | | |
|---|---|---|---|---|---|---|
| POINT NUMBER | #1 | #2 | #3 | #4 | #5 | #6 |
| POINT KIND | CAMERA IMAGING POINT | HEIGHT DETECTING POINT | DOT APPLICATION POINT | CAMERA IMAGING POINT | HEIGHT DETECTING POINT | DOT APPLICATION POINT |
| X-AXIS COORDINATE | 100 | 100 | 100 | 150 | 150 | 150 |
| Y-AXIS COORDINATE | 150 | 150 | 150 | 200 | 200 | 200 |
| Z-AXIS COORDINATE | 50 | 50 | 50 | 50 | 50 | 50 |
| CHANGEOVER TCP NUMBER | | | | | | |

*FIG. 4*

| | POINT SEQUENCE | | | | | |
|---|---|---|---|---|---|---|
| POINT NUMBER | #1 | #2 | #3 | #4 | #5 | #6 |
| POINT KIND | CAMERA IMAGING POINT | HEIGHT DETECTING POINT | DOT APPLICATION POINT | CAMERA IMAGING POINT | HEIGHT DETECTING POINT | DOT APPLICATION POINT |
| X-AXIS COORDINATE | 100 | 100 | 100 | 150 | 150 | 150 |
| Y-AXIS COORDINATE | 150 | 150 | 150 | 200 | 200 | 200 |
| Z-AXIS COORDINATE | 50 | 50 | 50 | 50 | 50 | 50 |
| CHANGEOVER TCP NUMBER | | | 2 | | | 2 |

*FIG. 5*

| POINT KIND DEFINITION | | |
|---|---|---|
| IDENTIFICATION INFORMATION | CameraTaking | 71 |
| OWNER | BuiltIn | 72 |
| PROTECTION MODE | PROTECTED | 73 |
| POINT KIND NAME | JAPANESE — カメラ撮り点<br>ENGLISH — Camera Taking Point | 74 |
| SOURCE POINT KIND INFORMATION | PTPPoint | 75 |
| REFERENCE TCP | CameraTCP | 76 |
| PRE-MOVEMENT WORK | If<br>sensorIn = Off<br>then<br>Call Error(10)<br>Endif<br>. . . . . . . | 77 |
| POST-MOVEMENT WORK | delay 200<br>takeCamera<br>. . . . . . . | 78 |
| . . . . . . | . . . . . . | |

FIG. 6

| TCP DEFINITION ||
|---|---|
| TCP IDENTIFICATION INFORMATION | CameraTCP |
| OWNER | BuiltIn |
| PROTECTION MODE | PROTECTED |
| TCP NAME — JAPANESE | カメラ |
| TCP NAME — ENGLISH | Camera |
| TCP-X COORDINATE [mm] | 30 |
| TCP-Y COORDINATE [mm] | 40 |
| TCP-Z COORDINATE [mm] | −15 |

*FIG. 7*

| PROTECTION MODE AND ACCESS RIGHT ||||| 
|---|---|---|---|---|
| | UN-RESTRICTED | PUBLIC | PROTECTED | PRIVATE |
| CHANGE RIGHT | ○ | × | × | × |
| REFERENCE RIGHT | ○ | ○ | × | × |
| UTILIZATION RIGHT | ○ | ○ | ○ | × |

*FIG. 8*

| CHANGEOVER TCP | | | |
|---|---|---|---|
| CHANGEOVER TCP NUMBER | 1 | 2 | 3 |
| TCP-X COORDINATE [mm] | 30 | 0 | 0 |
| TCP-Y COORDINATE [mm] | 40 | 0 | -40 |
| TCP-Z COORDINATE [mm] | -15 | 0 | -15 |

| ACTUATION CONDITION DEFINITION | | | |
|---|---|---|---|
| IDENTIFICATION INFORMATION | | SolderingPTPID | SolderingPTPID | 82a
| OWNER | | BuiltIn | BuiltIn | 82b
| PROTECTION MODE | | PROTECTED | PROTECTED | 82c
| PTP CONDITION NAME | JAPANESE | MOVEMENT BETWEEN SOLDERS | CLEANING | 82d
| | ENGLISH | Soldering | Cleaning |
| Z-MOVEMENT HEIGHT | | 5 | 50 | 82e
| Z-ONLY MOVE-UP DISTANCE | | | |
| Z-ONLY MOVE-DOWN DISTANCE | | | |

*FIG. 16*

| POINT KIND DEFINITION | | | |
|---|---|---|---|
| IDENTIFICATION INFORMATION | | PointSoldering | CleaningPoint | 71
| OWNER | | BuiltIn | BuiltIn | 72
| PROTECTION MODE | | PROTECTED | PROTECTED | 73
| POINT KIND NAME | JAPANESE | 点半田点 | クリーニング点 | 74
| | ENGLISH | Point Soldering | Cleaning Point |
| SOURCE POINT KIND INFORMATION | | PTPPoint | PTPPoint | 75
| REFERENCE PTP ACTUATION CONDITION | | SolderingPTPID | CleaningPTPID | 79
| ...... | | | |

*FIG. 17*

POINT SEQUENCE

| | | #1 | #2 | #3 | #4 | #5 | |
|---|---|---|---|---|---|---|---|
| 62 | POINT NUMBER | #1 | #2 | #3 | #4 | #5 | ... |
| 63 | POINT KIND | DOT SOLDERING POINT | DOT SOLDERING POINT | DOT SOLDERING POINT | DOT SOLDERING POINT | CLEANING POINT | |
| 64 | X-AXIS COORDINATE | 100 | 100 | 100 | 150 | 10 | |
| 64 | Y-AXIS COORDINATE | 150 | 160 | 170 | 180 | 10 | |
| 64 | Z-AXIS COORDINATE | 50 | 50 | 50 | 50 | 50 | |
| 66 | ACTUATION CONDITION NUMBER | | | | | | |

*FIG. 18*

POINT SEQUENCE

| | | #1 | #2 | #3 | #4 | #5 | |
|---|---|---|---|---|---|---|---|
| 62 | POINT NUMBER | #1 | #2 | #3 | #4 | #5 | ... |
| 63 | POINT KIND | DOT SOLDERING POINT | DOT SOLDERING POINT | DOT SOLDERING POINT | DOT SOLDERING POINT | CLEANING POINT | |
| 64 | X-AXIS COORDINATE | 100 | 100 | 100 | 150 | 10 | |
| 64 | Y-AXIS COORDINATE | 150 | 160 | 170 | 180 | 10 | |
| 64 | Z-AXIS COORDINATE | 50 | 50 | 50 | 50 | 50 | |
| 66 | ACTUATION CONDITION NUMBER | 1 | 1 | 1 | 1 | 2 | |

*FIG. 19*

| | POINT SEQUENCE | | | | | |
|---|---|---|---|---|---|---|
| | 61 | 61 | 61 | 61 | 61 | 61 |
| 62 / POINT NUMBER | #1 | #2 | #3 | #4 | #5 | #6 |
| 63 / POINT KIND | CAMERA IMAGING POINT | DOT APPLICATION POINT | CAMERA IMAGING POINT | DOT APPLICATION POINT | CAMERA IMAGING POINT | DOT APPLICATION POINT |
| 64 / X-AXIS COORDINATE | 100 | 100 | 100 | 150 | 150 | 150 |
| 64 / Y-AXIS COORDINATE | 150 | 150 | 150 | 200 | 200 | 200 |
| 64 / Z-AXIS COORDINATE | 50 | 50 | 50 | 50 | 50 | 50 |
| 65 / CHANGEOVER TCP NUMBER | 1 | 2 | 1 | 2 | 1 | 2 |
| 67 / WORK-PIECE CORRECTION NUMBER | | 1 | | 1 | | 1 |
| 68 / CAMERA-IMAGING-RESULT STORING NUMBER | 1 | | 1 | | 1 | |

POINT KIND DEFINITION

| IDENTIFICATION INFORMATION | CameraTaking | DispencePoint | — 71 |
|---|---|---|---|
| OWNER | BuiltIn | BuiltIn | — 72 |
| PROTECTION MODE | PROTECTED | PROTECTED | — 73 |
| POINT KIND NAME — JAPANESE | カメラ撮り点 | 点塗布点 | — 74 |
| POINT KIND NAME — ENGLISH | Camera Taking Point | Point Dispence | |
| SOURCE POINT KIND INFORMATION | PTPPoint | PTPPoint | — 75 |
| REFERENCE PTP | CameraTCP | NeedleTCP | — 76 |
| WORK-PIECE POSITION CORRECTION | NO | YES | — 80 |
| ...... | | | |

*FIG. 22*

POINT SEQUENCE

| | POINT NUMBER | #1 | #2 | #3 | #4 | #5 | #6 |
|---|---|---|---|---|---|---|---|
| 62 | POINT NUMBER | #1 | #2 | #3 | #4 | #5 | #6 |
| 63 | POINT KIND | CAMERA IMAGING POINT | HEIGHT DETECTING POINT | DOT APPLICATION POINT | CAMERA IMAGING POINT | HEIGHT DETECTING POINT | DOT APPLICATION POINT |
| 64 | X-AXIS COORDINATE | 100 | 100 | 100 | 150 | 150 | 150 |
| 64 | Y-AXIS COORDINATE | 150 | 150 | 150 | 200 | 200 | 200 |
| 64 | Z-AXIS COORDINATE | 50 | 50 | 50 | 50 | 50 | 50 |
| 65 | CHANGEOVER TCP NUMBER | | | | | | |
| 67 | WORK-PIECE CORRECTION NUMBER | | | | | | |
| 68 | CAMERA-IMAGING-RESULT STORING NUMBER | | | | | | |

*FIG. 23*

| TCP DEFINITION | POINT KIND DEFINITION |
|---|---|
| CAMERA | CAMERA IMAGING POINT |

| ACTUATION CONDITION DEFINITION | POINT KIND DEFINITION |
|---|---|
| MOVEMENT BETWEEN SOLDERS | DOT SOLDERING POINT |
| CLEANING | CLEANING POINT |

*FIG. 24*

ROBOT

CROSS-REFERENCE TO RELATED APPLICATIONS

This application is based upon and claims the benefit of priority from Japan Patent Application No. 2015-118736, filed on Jun. 11, 2015, the entire contents of which are incorporated herein by reference.

FIELD OF THE INVENTION

The present invention relates to a robot that is controlled by a computer which executes a point-based program.

BACKGROUND

Various industrial robots are becoming popular. Robots are utilized for screw fastening, welding, and painting to a work-piece, carriage of the work-piece, attachment and soldering of a part to the work-piece, etc. Such robots include, for example, a vertical multi-joint type moving unit, and a work tool is attached to the moving unit. A computer that executes a program controls the moving unit and the work tool. Under the control of the computer, the work tool is moved to and actuated at a predetermined point.

The program is described in a point-based robot language. This program includes a point sequence that has point statements arranged at each of a plurality of points on a work-piece. The point statement contains a point number as a head, point kind information, and point coordinate information. The point kind information is a so-called function identifier, and identifies an instruction sequence that defines control details such as work details to a point or a moving method. The point sequence is created by a point teaching designating and registering the position of a point, where a work is performed, on the work-piece.

The robot controls the moving unit and the work tool in accordance with the instruction sequence identified by the point kind information, moves the work tool toward a point indicated by the coordinate information, and executes a work at the point.

For example, in an application work applying an application material, the work tool when performing a main work, which is the application is a "needle". In addition, auxiliary work tools, such as a "camera" that detects the position of a work-piece, and a "height sensor" that detects the height of the work-piece may be also utilized. In this case, when a plurality of work tools are attached to the common moving unit, the attachment position of each work tool differs. Hence, even if a work performed at the same point on the work-piece, when changing the work tool utilized, it is necessary for the moving unit to adjust the position of the work tool so as to be positioned at the same point.

The position of the work tool positioned relative to each point on the work-piece is called a Tool Center Point (TCP) of each work tool. When the work tool is changed, it is necessary to also change the TCP.

When a plurality of work tools is fastened to the common moving unit for a work, the relative positional relationship among the work tools does not change. Hence, the relative positional relationship of each work tool relative to the same point on the work-piece is determined beforehand. Accordingly, when point teaching is carried out, the relative positional relationship of each work tools is settable beforehand as a point attribute. Information indicating such relative positional relationship is called a "changeover TCP". The robot changes the TCP of each work tool based on the changeover TCP set for each point when executing a program, thereby positioning the work tool relative to the point.

In the point teaching, however, when the number of points increases, it is necessary to designate point by point, what work tool is to be utilized, what work is to be executed, and what changeover TCP should be selected in accordance with the foregoing two conditions. Accordingly, a manipulation to designate the changeover TCP is complicated, and the possibility of error in designation increases.

The present invention has been proposed in order to address the above technical problems of conventional technologies, and an objective is to provide a robot which does not need an information setting to adjust the position of a work tool for each point, and which is capable of suppressing an error.

SUMMARY OF THE INVENTION

In order to accomplish the above objective, a robot according to an aspect of the present invention includes:
a plurality of work tools performing a work on a point on a work-piece;
a moving unit moving the plurality of work tools to the point; and
a controller controlling the work tool and the moving unit in accordance with a main program,
in which the controller includes:
a main program memory storing the main program;
a point sequence memory storing a point sequence including statements arranged in sequence for each point, the statement containing a kind information identifying control details to the work tool, and a coordinate information on the point;
a point kind definition memory storing a point kind definition describing the control details identified by the kind information, the point kind definition containing reference information to refer adjustment information for each of the work tools;
an adjustment information memory storing the adjustment information prepared for each of the work tools corresponding to the reference information;
an executing unit executing the main program in accordance with the point sequence; and
a referring unit applying the adjustment information to the control details by referring the adjustment information based on the reference information when inheriting the point kind definition contained in the point sequence during the execution by the executing unit.

The adjustment information may contain a tool position definition containing offset information for each of the work tools relative to a same coordinate on the work-piece.

The robot may further include:
a display unit displaying a list of names of the plurality of tool position definition when a position of the point in the point sequence is detected;
a selecting unit selecting any tool position definition in accordance with the work tool from the list displayed on the display; and
an adjusting unit applying the offset information set by the selected tool position definition when the detected position of the point is registered in the point sequence.

The robot may further include a registering unit registering, as a coordinate of the point in the point sequence, when the selecting unit selects the tool position definition corresponding to the work tool that is a camera, a value obtained by applying an offset to the detected coordinate by the camera based on the offset information.

The adjustment information may contain an actuation condition definition defining an actuation condition indicating how each of the work tools is actuated. The adjustment information may contain correction information for correcting a position of the work-piece.

The point kind definition may contain a first information indicating that another point kind definition is inherited, and a second information indicating that the reference information contained in the inherited point kind definition is also inherited.

The robot may further include a display unit displaying a list of the point kind definitions referring the adjustment information.

According to the present invention, when the point sequence inherits the point kind information, by referring the reference information contained in the point kind information, the position for each work tool is adjustable. Hence, it is unnecessary to set information for adjusting the position of the work tool for each point, thereby preventing an error.

BRIEF DESCRIPTION OF THE DRAWINGS

FIG. 4 is an exemplary diagram illustrating the entire structure of a point sequence that has no setting for a changeover TCP number;

FIG. 5 is an exemplary diagram illustrating the entire structure of a point sequence that has a setting for the changeover TCP number;

FIG. 6 is an exemplary diagram illustrating the entire structure of a point kind definition;

FIG. 7 is an exemplary diagram illustrating the entire structure of a TCP definition;

FIG. 8 is an explanatory diagram illustrating a protection mode and an access authority;

FIG. 16 is an exemplary diagram illustrating the entire structure of the PTP actuation condition definition;

FIG. 17 is an exemplary diagram illustrating the entire structure of the point kind definition that refers to the PTP actuation condition definition;

FIG. 18 is an exemplary diagram illustrating the entire structure of the point sequence that has no setting for an actuation condition number;

FIG. 19 is an exemplary diagram illustrating the entire structure of the point sequence that has a setting for the actuation condition number;

FIG. 22 is an exemplary diagram illustrating the entire structure of the point kind definition that has a setting indicating whether or not to perform a position correction on the work-piece;

FIG. 23 is an exemplary diagram illustrating the entire structure of the point sequence that has no setting for the work-piece correction number and the camera-imaging-result storing number; and FIG. 24 is a diagram illustrating a list of point kind definitions to be referred.

DETAILED DESCRIPTION OF THE EMBODIMENTS

[Structure of Robot]

Figure 1:
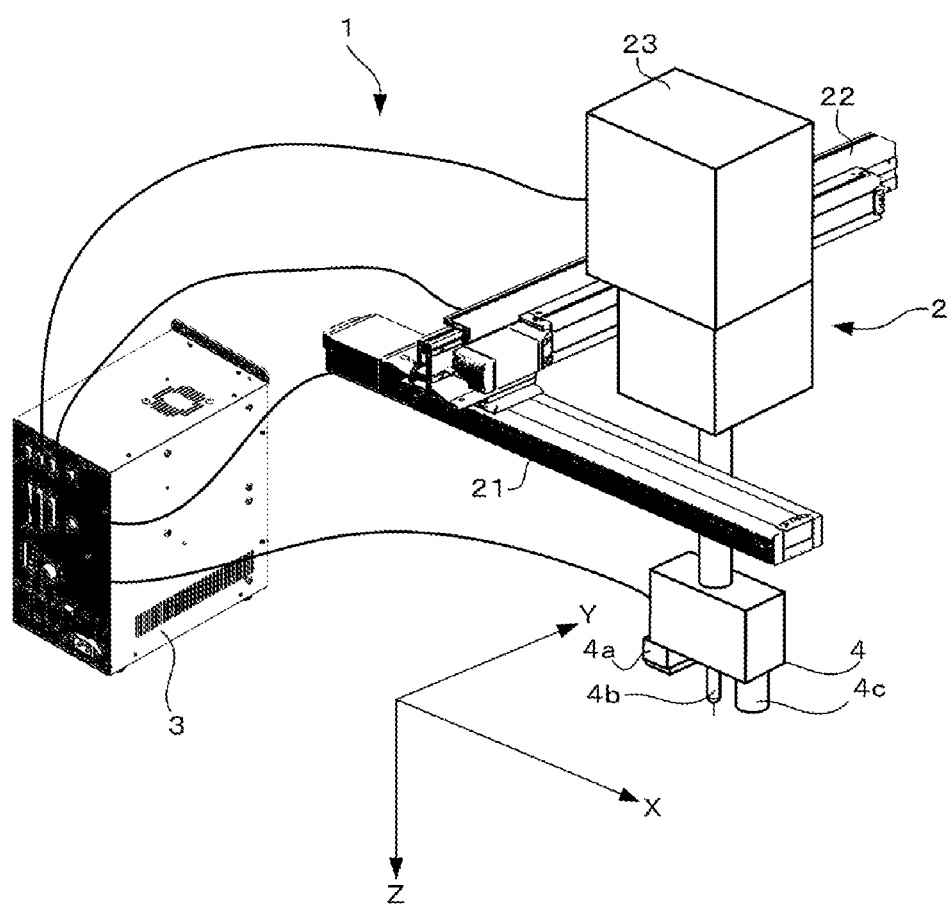
FIG. 1 is an exemplary diagram illustrating the entire structure of a robot.

A robot according to an embodiment of the present invention will be explained below in detail with reference to the accompanying figures. As illustrated in FIG. 1, a robot 1 includes a moving unit 2, and a control unit 3. A work tool 4 is attached to the moving unit 2. The robot 1 positions the work tool 4 at a desired position through the moving unit 2, and actuates the work tool 4.

Figure 2:
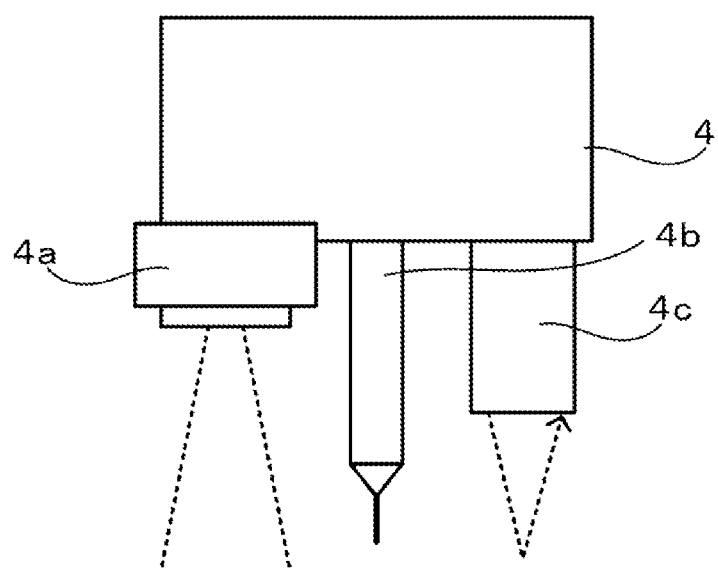
FIG. 2 is a front view illustrating the structure of a work tool.

The moving unit 2 moves the plurality of work tools 4. Each work tool 4 executes a work at a point on a work-piece. As illustrated in FIG. 2, the work tools 4 include a camera 4a, a needle 4b, and a height sensor 4c. The camera 4a picks up an image of a marking on the work-piece, thereby detecting the position of the work-piece. The needle 4b applies an application material to the work-piece. The height sensor 4c detects a distance (hereinafter, simply referred to as a height) from the work tool 4 to the surface of the work-piece.

As illustrated in FIG. 1, the moving unit 2 moves the work tool 4 in an X-axis direction, a Y-axis direction, and a Z-axis direction, and positions the work tool 4 at a designated point. The X-axis direction is a first direction parallel to a plane on which a work-piece is placed. The Y-axis direction is a second direction parallel to the plane and orthogonal to the X-axis direction. The Z-axis direction is a height direction. The moving unit 2 includes an X-linear slider 21 that moves the work tool 4 in the X-axis direction, a Y-linear slider 22 that moves the work tool 4 in the Y-axis direction, and a Z-linear slider 23 that moves the work tool 4 in the Z-axis direction.

The X linear slider 21 has the Y linear slider 22 provided slidably on a rail that extends in the X-axis direction, and has the Y linear slider 22 fastened with an endless belt that runs in the X-axis direction which is orthogonal to the Y linear slider 22. The endless belt is run by an X-axis motor to move the Y linear slider 22 along the X-axis direction.

The Y linear slider 22 has the Z linear slider 23 provided slidably on a rail that extends in the Y-axis direction, and has the Z linear slider 23 fastened with an endless belt that runs in the Y-axis direction. The endless belt is run by a Y-axis motor to move the Z linear slider 23 along the Y-axis direction. Example transmission mechanisms for the X and Y linear sliders 21, 22 are, in addition to endless belts, various actuators including a cylinder and a lead screw.

The Z linear slider 23 includes an arm with an axis that in parallel with the Z-axis direction, and the work tool 4 is attached to the leading end of this arm. This Z linear slider 23 includes, for example, a rack-and-pinion mechanism, has the rack elongated in the Z-axis direction, and has the arm fixed to this rack. The pinion is turned by a Z-axis motor to move the arm in the Z-axis direction. This Z linear slider 23 moves the work tool 4 in the Z-axis direction.

Figure 3:
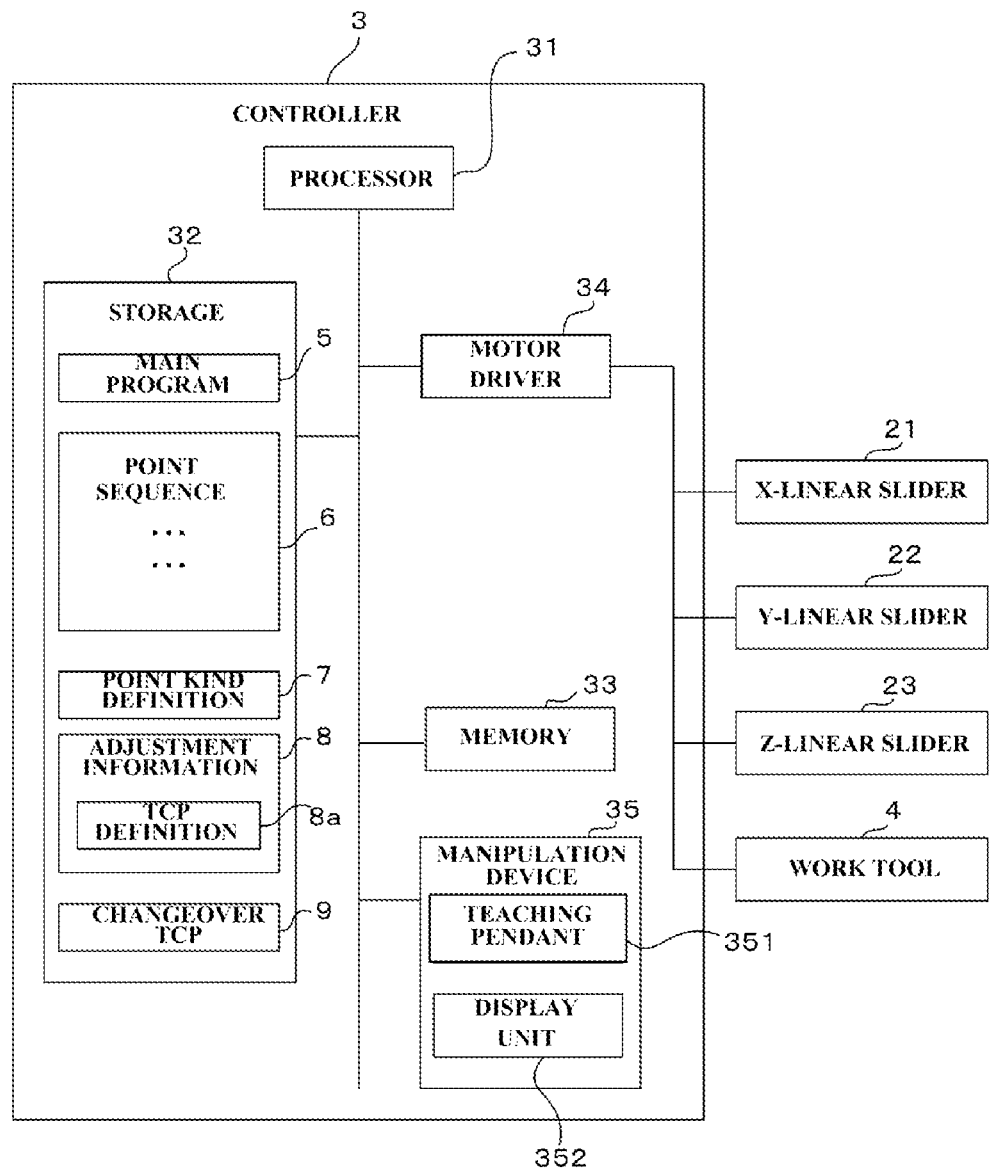
FIG. 3 is a block diagram illustrating the structure of a controller.

As illustrated in FIG. 3, the controller 3 is a so-called computer that includes a processor 31, a storage 32, a memory 33, and peripheral devices. The peripheral devices are a motor driver 34, and a manipulation device 35. The storage 32 stores programs, such as a main program 5, a a point sequence 6, point kind definition 7, adjustment information 8, and a changeover TCP 9. Each memory area of each information of the storage 32 constructs a storing unit for each information. The main program 5 and the point sequence 6 are executed as a main routine, while the point kind definition 7 is executed as a sub routine. The adjustment information 8 is referred when the sub routine is executed. The changeover TCP 9 is referred when the point sequence 6 is executed.

The processor 31 controls the entire robot 1. The processor 31 mainly includes a Central Processing Unit (CPU). The processor 31 executes computing processes, such as information inputting, storing, outputting, displaying, and motor driving, and a control process for the peripheral devices in accordance with the main program 5.

The processor 31 inherits the point kind definition described in the point sequence when executing the main program 5 in accordance with the point sequence, and refers to the adjustment information 8 based on reference information set up in the point kind definition when executing such a program. The programs are developed in the memory 33 as needed, and a computation result by the processor 31 is temporarily stored therein. The motor driver 34 supplies power pulses to respective motors that are the X-axis motor, the Y-axis motor, and the Z-axis motor in accordance with an instruction signal input as a result of the control process by the processor 31.

The manipulation device 35 includes a display unit 352 like a liquid crystal display, a mouse, a keyboard, and a teaching pendant 351. The teaching pendant 351 is an input device to teach operations to the robot 1. The programs are created and edited through such a teaching manipulation using the manipulation device 35. When a manipulating user performs a desired setting, the setting is input through the manipulation using the manipulation device 35.

An example operation of the robot 1 in accordance with the programs will be explained. As illustrated in FIG. 4, the point sequence to be executed by the main program 5 contains settings for points #1 to #6 that indicate the positions on the work-piece. Point kind information 63 that indicates point kind definition 7 which defines a movement of the work tool 4 to each point #1 to #6, and also a work at such point is set for each point #1 to #6.

As illustrated in FIG. 1, the camera 4a, the needle 4b, and the height sensor 4c are all attached to the Z-linear slider 23. In this case, when respective TCPs of the work tools 4 are matched with the same point on the work-piece, the coordinate of the moving unit 2 becomes different for each work tool 4.

For example, the camera 4a detects a marking, and the height sensor 4c detects a height with respect to the same point on the work-piece. Next, the position where the application material is actually applied is corrected based on the two detection results, and the needle 4b applies the application material. At this time, the robot 1 is operable with an image-pickup position, a height detecting position, and the position where the application material is applied being set as different coordinates by teaching.

However, to what the work tool 4 is positioned is the "same point" on the work-piece. Hence, a relative positional difference depending on the work tool 4 is set beforehand as offset information that is a changeover TCP value as illustrated in FIG. 5. Next, the common coordinate is applied as the coordinate of the target point on the work-piece, and the respective work tools 4 are actuated at respective offset positions calculated by applying an offset to the common coordinate by the changeover TCP value. When the point on the work-piece where each work tool 4 is to be guided is expressed as the same coordinate at the same point, there is an advantageous effect that, when a point is changed and the work is performed at the next point, it is sufficient if the adjustment of the position is simply performed by the changeover TCP.

In the case of three orthogonal axes, the changeover TCP becomes a TCP value that indicates the X value, the Y value, and the Z value simply for an addition and a subtraction of the common coordinate. In the following explanation, the adjustment is performed with the TCP value in the three orthogonal axes, but the present invention is not limited to this case. In the case of, for example, the robot 1 to which a rotation axis R is added, when the camera 4a, the needle 4b, and the height sensor 4c rotate around the rotation axis R, the TCP value designates at which location each work tool is positioned relative to the rotation center that is the rotation axis R. This enables a precise positioning of each work tool 4 relative to each point on the work-piece.

[Structure of Program]

(Main Program)

The main program 5 drives the moving unit 2 in accordance with the point sequence, thereby positioning each work tool 4 at an appropriate position for the work to be done by each work tool 4 relative to each point on the work-piece.

(Point Sequence)

As illustrated in FIG. 4, the point sequence 6 includes point statements 61 arranged in sequence for the respective points #1 to #6. The point statement 61 indicates the position of the point and control details. This point statement 61 contains, with a point number 62 being as a head, the point kind information 63, and point coordinate information 64 arranged in sequence. Some point statements 61 may further contain a changeover TCP number 65 arranged in sequence.

The point number 62 clarifies a declaration that the point statement 61 is in a point-based sentence structure, and a delimiter, and, divides the point statements 61. The point coordinate information 64 identifies the position of the point in the coordinate system of the robot 1. For example, respective X, Y, and Z coordinates of the points #1 to #6 are identified. The changeover TCP number 65 is a number added to a setting for each work tool 4 in a changeover TCP 9 to be explained later. In this embodiment, as illustrated in FIG. 4, no changeover TCP number 65 may be set in the point sequence 6. However, as illustrated in FIG. 5, only some point statements 61 may have the respective changeover TCP number 65.

(Point Kind Definition)

The point kind definition 7 is a so-called function identifier that indicates the subprogram 7 which defines the control details to the point. This point kind definition 7 contains an instruction sequence that defines a moving method and work details, and reference information for interlinking with the adjustment information 8. Example point kind definitions 7 are "camera imaging point", "height detecting point", and "dot application point". The camera imaging point relates to a work for the camera 4*a* to pick up an image of the marking on the work-piece. The height detecting point relates to a work for the height sensor 4*c* to detect a height. The dot application point relates to a work for the needle 4*b* to apply an application material.

FIG. 6 illustrates an example point kind definition 7 in which the camera imaging point is defined. Identification information 71 is a so-called function identifier that identifies the point kind definition 7. The point kind definition 7 is created by designating the identification information 71.

An owner 72 is a person who has an account at the time of creation, and has an authority to manage the point kind definition 7. A protect mode 73 indicates a setting for a mode that has a different level in access right to be explained later. Note that it is expected that the point kind definition 7 is mainly created by a dealer, a device manufacturer, and an installation service company.

In addition, a point kind name 74 is a name set to display the point kind definition 7. When, for example, such a name is prepared in different languages like Japanese and English etc., such as "camera imaging point (in Japanese)", "camera taking point (in English)", the displayed name is changed in accordance with a change in display language, thereby facilitating understanding. In the point sequence 6 illustrated in FIGS. 4 and 5, by setting the point kind name 74 in the point kind information 63, the point kind definition 7 is inherited.

In source point kind information 75, another point kind definition 7 to be inherited by the point kind definition 7 is designated. This designation is made by designating the identification information 71 in the point kind definition 7. For example, PTPPoint is a point kind definition 7 that contains a moving-method instruction sequence indicating a PTP movement that moves the work tool 4 linearly so as to interconnect the points.

Reference information of the adjustment information 8 to be referred is designated in a reference TCP 76. As example reference information, for example, TCP identification information 81*a* in a TCP definition 81 to be explained later is designated. When, however, there is no TCP definition 81 to be referred, no setting may be made in the reference TCP 76. When the TCP definition 81 is designated in the reference TCP 76 and when the work tool 4 is moved to the point that designates this point kind definition 7, setting for the TCP definition 81 designated as the reference TCP 76 is referred for an operation.

A pre-movement work 77 is a bundle of the statements executed before a movement to a point. A post-movement work 78 is a bundle of statements executed after the movement to the point.

(TCP Definition)

The TCP definition 81 is the adjustment information prepared for each work tool 4 corresponding to the reference information. FIG. 7 illustrates an example of TCP definition 81 corresponding to the work tool 4 that is the camera 4*a*. TCP identification information 81*a* is reference information that identifies the TCP definition 81. By setting the TCP identification information 81*a* of the TCP definition 81 in the reference TCP 76 of the point kind definition 7, such a TCP definition 81 will be referred. The TCP identification information 81*a* may be letters or numbers. An owner 81*b* and a protection mode 81*c* are the same as the owner 72 and the protection mode 73 explained above.

A TCP name 81*d* is a name set to display the information. Such a name is prepared in different languages like Japanese and English etc., such as "camera (in Japanese)", "camera (in English)", and the displayed TCP name is changed in accordance with a change in display language, thereby facilitating understanding.

A TCP value 81*e* is prepared corresponding to the reference information, and is tool position information that is the offset information for each work tool 4 relative to the same coordinate on the work-piece. For example, in the case of FIG. 7, a TCP-X coordinate, a TCP-Y coordinate, and a TCP-Z coordinate are set as respective offset values of the camera 4*a* when the TCP value 81*e* of the needle 4*b* is (0, 0, 0). The reason why a value is placed in Z is that it is necessary for the camera 4*a* to increase the height for image-pickup relative to the height at which the needle 4*b* applies the application material.

It is expected that the TCP definition 81 is mainly set by a dealer, a device manufacturer, and an installation service company. However, it is also expected that the TCP value 81*e* is set by a final end user, and a manipulating user. Hence, easiness for understanding is necessary.

In FIG. 7, the memory area for each TCP value 81*e* is directly set within the TCP definition 81. However, the value itself is not always a "definition", and an additional memory area for the TCP value 81*e* may be prepared and referred. In this case, the TCP value 81*e* is handled as the adjustment information 8, and identification information which identifies each TCP value 81*e*, and which is referred by the TCP definition 81, etc., may be handled as the reference information.

(Protection Mode and Access Right)

When the adjustment information 8 such as the point kind information 7, and the TCP definition 81 etc. are created, the owner 72 can be registered by creating such information in a login status based on an account defined by a login ID and a password prepared beforehand. When the level of the access right for a person other than the owner 72 is set in the protection mode 73, re-writing and deletion due originating from an improper manipulation by the other person are preventable. The same is true of the owner 81*b*, the protection mode 81*c*, and, the owner 82*b*, and the protection mode 82*c* to be explained later.

FIG. 8 illustrates an example of the protection mode and the access right. The access right includes a change right, a reference right, and a utilization right. The change right enables a person to change, e.g., re-write or delete the point kind definition 7 and the adjustment information 8. The reference right enables a person to refer to the details of the point kind definition 7 and those of the adjustment information 8. When a person has the reference right, the user is capable of knowing the identification information, referring to the point kind definition 7 and the adjustment information 8, and, referring to and changing a set value that is a variable based on the identification information.

In the example case in FIG. 6, based on CameraTCP that is the identification information of the TCP 81, the TCP value 81*e* may be referred and set on the basis of a variable identifier, such as CameraTCP.X, CameraTCP.Y, or CameraTCP.Z. The utilization right does not allow any changes and references, but enables a setting of the TCP value 81*e* in the TCP definition 81. The TCP name 81*d* displayed as a choice can be known with the utilization right only, but the identification information is unknown only with such a right.

Example protection modes are unrestricted, public, protected, and private. The "unrestricted" mode covers all rights that are the change right, the reference right, and the utilization right. The "public" mode does not cover the change right but covers the reference right and the utilization right. The "protected" mode does not cover the change right and the reference right, but covers the utilization right. The "private" mode does not cover the change right, reference right, and utilization right at all.

When, for example, the "private" mode is set, the manipulating user is prevented from changing the TCP value 81e by an improper manipulation, and is capable of utilizing the TCP value 81e by simply designating the point kind definition 7 even if the manipulating user does not know the TCP value 81e itself.

(Changeover TCP)

Figures 9, 10:
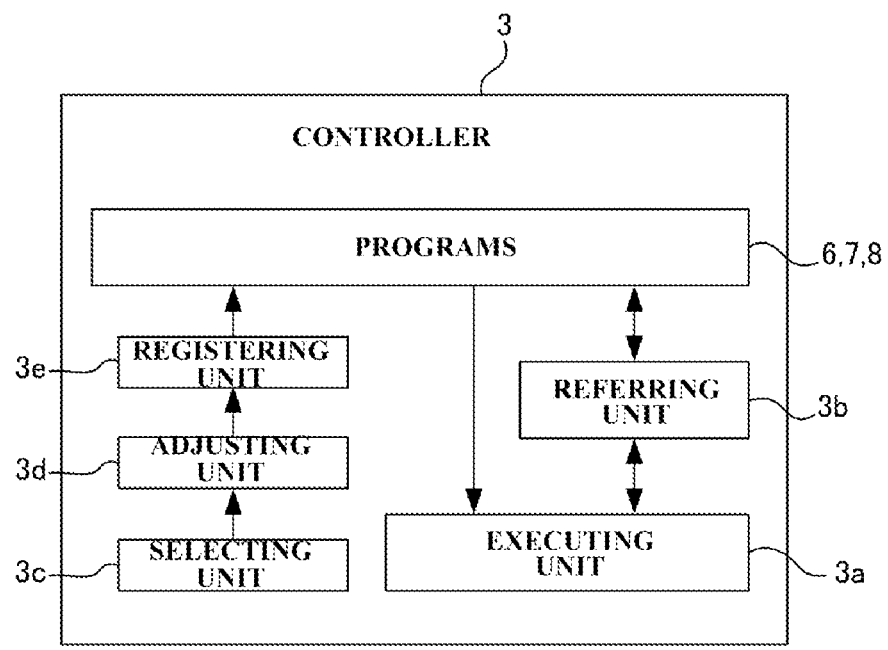
FIG. 9 is an exemplary diagram illustrating a changeover TCP.
FIG. 10 is a block diagram illustrating the function of the controller.

The changeover TCP 9 is a TCP value that is the offset information prepared in accordance with each work tool 4. FIG. 9 illustrates an example case in which the changeover TCP 9 that is three TCPs are prepared. Changeover TCP numbers 1, 2, and 3 correspond to the camera 4a, the needle 4b, and the height sensor 4c, respectively.

FIG. 9 illustrates respective example TCP values. In these examples, like CameraTCP in the above TCP definition 81, the TCP values for the camera 4a and height sensor 4c are indicated as respective offset values relative to the needle 4b having the TCP value that is (0, 0, 0). The reason why a value is placed in Z is that it is necessary for the camera 4a and the sensor 4c to increase the height for detection relative to the height at which the needle 4b applies the application material.

Note that the TCP value may be set in the main program 5 and a program for the point kind definition 7. In addition, a commonly applicable TCP value may be additionally prepared, and when there is no setting for the TCP value for any of them, the common TCP value may be referred.

[Each Process Unit of Controller]

The controller 3 functions as a control unit for the robot 1, and as illustrated in FIG. 10, includes an executing unit 3a, and a referring unit 3b. The executing unit 3a executes the main program 5. The referring unit 3b refers to the adjustment information 8 based on the reference information, thereby applying the adjustment information to the control details when inheriting the point kind information 7 contained in the point sequence 6 while the executing unit 3a is executing the main program 5. In this embodiment, when the point kind definition 7 is inherited, based on the reference TCP 76, the TCP definition 81 is referred, and the TCP value 81e set in the TCP definition 81 is applied as an offset value for the coordinate of the point.

In addition, the controller 3 functions as a programming tool. The controller 3 newly creates and edits the programs in response to an input manipulation given to the manipulation device 35. The editing of the programs includes a point teaching which designates a point subjected to a work, and creates a point sequence. For example, the display unit 352 displays the details of the point sequence, and for each point number 62, the point kind information 63 and the point coordinate information 64 are set up in response to an input manipulation given to the manipulation device 35.

In this embodiment, when point teaching is carried out using the manipulation device 35, the TCP definition 81 is implicitly referred by designating, not the changeover TCP number 65 but the point kind information 63. Hence, the TCP value is changed without an explicit designation of the TCP value for each point.

Still further, the controller 3 reflects the TCP value 81e in the TCP definition 81, and registers the coordinate when the coordinate in point teaching is registered. Hence, the controller 3 includes a selecting unit 3c, an adjusting unit 3d, and a registering unit 3e. The selecting unit 3c selects the TCP definition 81 in accordance with the work tool 4 to be utilized from a list of the plurality of TCP definitions 81 which are defined beforehand for each of the respective work tools 4, and which are displayed on the display unit 352, e.g., a list of TCP names 81d illustrated in FIG. 11. The adjusting unit 3d applies the offset value of the coordinate of the work tool 4 by the TCP value 81e in the selected TCP definition 81 as the coordinate registered in teaching. The registering unit 3e registers the offset value by the adjusting unit 3d as the coordinate of the point in the point sequence 6.

[Action]

(Movement of Work Tool)

Figure 12:
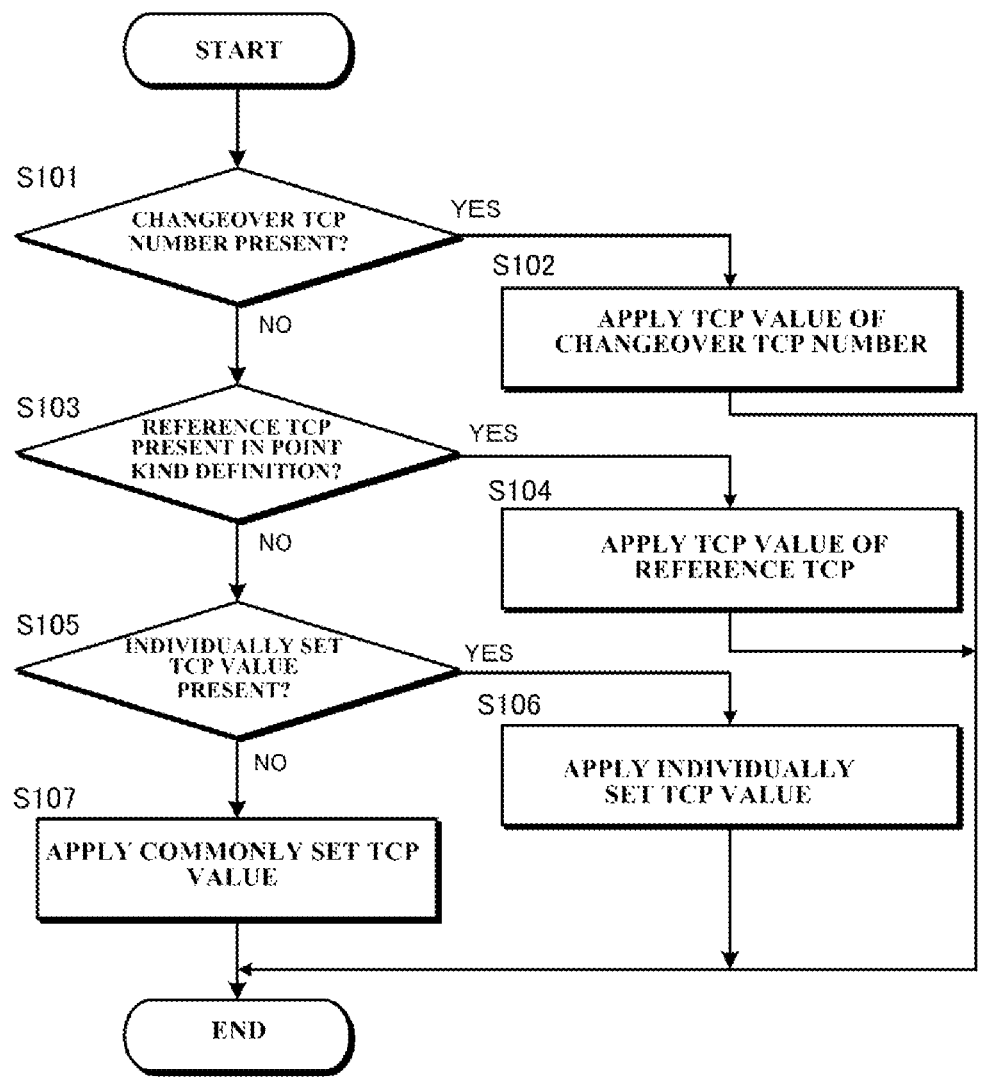
FIG. 12 is a flowchart illustrating the execution operation of programs by the controller.
Figure 13:
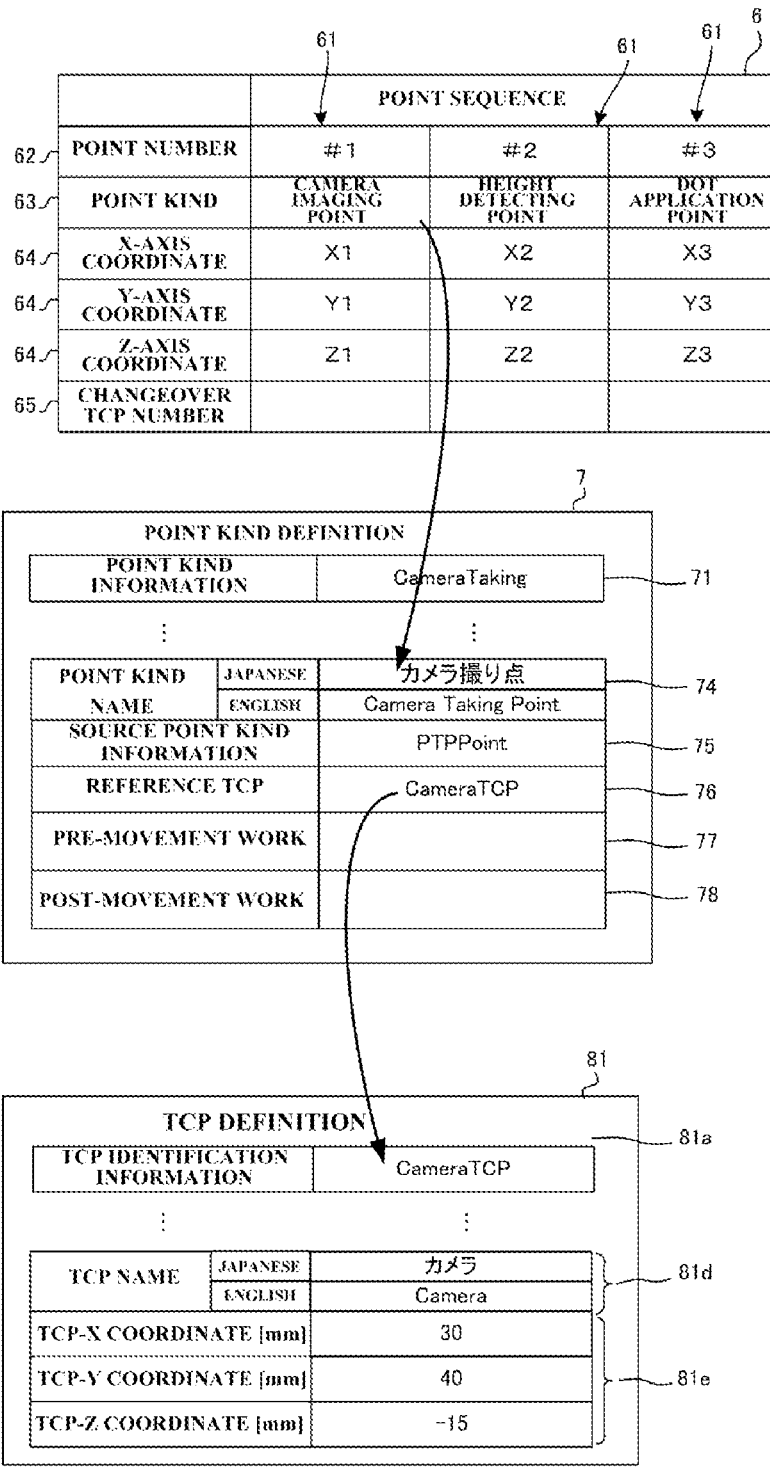
FIG. 13 is an exemplary diagram illustrating an example execution of the point statement.

An example movement control on the work tool 4 toward each point according to this embodiment will be explained with reference to a flowchart that is FIG. 12, and an explanatory diagram that is FIG. 13. Note that FIG. 12 is a flowchart only for the movement of the work tool 4 toward the point and taken out from the entire operation of the robot 1. As for a part which designates the operation of the work tool 4 at each point, and a position adjustment, such as fine correction, of the application point based on the camera imaging and height detection results, the explanation will be omitted. That is, the explanation will be given of only the operation that eliminates a difference in coordinate due to the difference in work tool 4 based on the TCP value. In addition, FIG. 13 is a diagram illustrating a flow of inheriting of the point kind definition 7 by the point sequence 6, and referring of the TCP definition 81 by the point kind definition 7, and some information will be omitted.

The executing unit 3a of the controller 3 executes the respective point statements 61 set in the point sequence 6 in the order of the point number 62 when executing the main program 5. First, the executing unit 3a determines (step S101) whether or not the changeover TCP number 65 is set for the point in the point sequence 6. The changeover TCP number 65 added for each point has the highest priority.

When the changeover TCP number 65 is set (step S101: YES), the TCP value corresponding to the changeover TCP number 65 is taken out instead of implicit designation in the point kind definition 7, a value obtained by applying the offset to the coordinate value of the point by the TCP value is calculated, and the work tool 4 is moved (step S102) to that position.

When no changeover TCP number 65 is set for the point (step S101: NO), the referring unit 3b determines (step S103) whether or not the reference TCP 76 is designated for the point kind definition 7 set for that point.

When the reference TCP 76 is designated for the point kind definition 7 (step S103: YES), the referring unit 3b takes out the TCP value 81e in the TCP definition 81 designated by the reference TCP 76, calculates a value obtained by applying an offset to the coordinate value of the point by the TCP value 81e, and moves the work tool 4 to that position (step S104).

For example, as illustrated in FIG. 13, no changeover TCP number 65 is set in the point statement 61 that has the point number which is 1. In addition, the TCP definition 81 that has the reference name which is CameraTCP is set for the reference TCP 76 when the point kind definition 7 for the camera imaging point set in the point kind 63 is inherited. Hence, the referring unit 3b refers to the TCP definition 81 of CameraTCP. The camera 4a is moved to a target coordinate that is a value obtained by applying an offset to the coordinate set in the point number 1 in the point sequence 6.

Still further, when no reference TCP 76 is designated in the point kind definition 7 (step S103: NO), the executing unit 3a determines (step S105) whether or not the TCP value is designated in the program individual setting in the point kind definition 7 (step S105).

When there is an individually set TCP value for the program (step S105: YES), a value obtained by applying an offset to the coordinate in the point sequence 6 by this TCP value is calculated, and the work tool 4 is moved to this position (step S106).

When there is no individually set TCP value for the program (step S105: NO), the commonly set TCP value is taken out, a value obtained by applying an offset to the coordinate in the point sequence 6 by this TCP value is calculated, and the work tool 4 is moved to this position (step S107).

(Point Teaching)

Next, an explanation will be given of a point teaching process of creating the point sequence 6 for the above operation. As a preparation for the point teaching according to this embodiment, the manipulating user "defines" "camera TCP", "height TCP", "needle TCP", and etc. beforehand, thereby preparing the TCP definition 81. Subsequently, the TCP definition 81 corresponding to the work tool 4 for a point kind among the point kind definitions 7 is selected and set. That is, the point kind definition 7 is interlinked with the TCP definition 81.

An example teaching using the TCP definition 81 interlinked with the point kind definition 7 as explained above will be explained with reference to the point sequence in FIG. 4 and the explanatory diagrams that are FIGS. 11(*a*) and 11(*b*).

First of all, an explanation will be given of an example case in which teaching for a point that has the point number which is 1 in the point sequence illustrated in FIG. 4 is carried out. In this case, as illustrated in FIG. 11(*a*), when the point is detected by the camera 4*a* in teaching, the selecting unit 3*c* selects the "camera" from the list of the TCP names 81*d* for the TCP definition 81 displayed on the display unit 352 corresponding to the manipulation device 35.

The manipulating user moves the camera 4*a* while viewing the picked-up image by the camera 4*a* using the manipulation device 35, and aligns the cross-cursor position that is the center of the image with a target. The adjusting unit 3*d* obtains a coordinate that is the coordinate of the camera 4*a* at this time to which an offset is applied by the TCP value 81*e* in the selected TCP definition 81. Next, the registering unit 3*e* registers the obtained coordinate in the point sequence 6 as the coordinate of a point where the work is to be performed. In the example case illustrated in FIG. 4, the coordinate that is (X, Y, Z)=(100, 150, 50) is registered. When the work at the point number that is 1 is camera imaging, the point kind information 63 that is "camera imaging point" is set.

When works are to be performed to the same point on the work-piece, the registered coordinate in the point sequence is consistent. That is, although the work details are different, the point numbers 1-3 in FIG. 4 are for the same point. The point numbers 4-6 are also for the same point although the work details are different. By setting different point kinds 63 for the same point of the point numbers 1 to 3, and the same point of the point numbers 4 to 6, a work by the different work tool 4 is registered.

Figure 11:
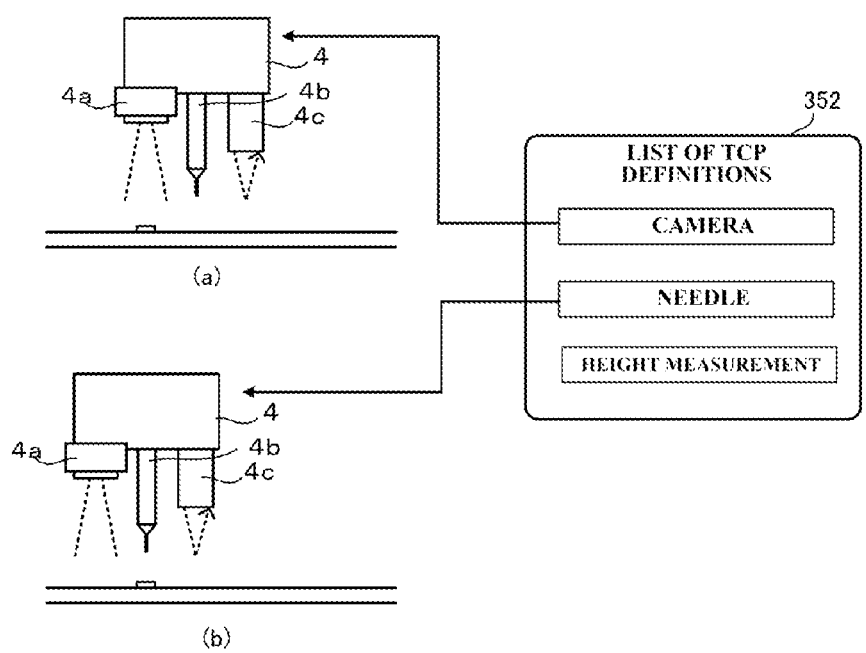
FIG. 11 is an exemplary diagram illustrating a setting screen for the TCP definition in point teaching.

In addition, as illustrated in FIG. 11(*b*), in the case of dot application at the point number 3, the application work is performed with the offset value to the coordinate of the point being changed to the TCP value 81*e* in the TCP definition 81 which is "needle" and to be referred in the point kind definition 7. That is, as explained above, when the point kind definition 7 for the dot application at the point number 3 is inherited, the TCP definition 81 for the dot application set in the point kind definition 7 is referred, and the "needle" is moved to the coordinate obtained by applying an offset to the coordinate of the point by the TCP value 81*e*. As explained above, even if the registered coordinate value is consistent, the different work tools 4 are moved to respective appropriate positions, and the work is performed.

[Effect]

According to this embodiment, by interlinking the point kind definition 7 with the TCP definition 81, when a work to each point is performed, the operation is performed with reference to the TCP value 81*e* set in the TCP definition 81. Hence, it becomes unnecessary to explicitly set the TCP number as an attribute for each point in the point sequence 6, and thus the manipulation is simplified. This reduces a possibility of error occurrence.

In particular, according to conventional point teaching that utilizes the camera 4*a*, calibrations, such as calculating a difference between the attached position of the camera 4*a* and that of the needle 4*b*, and calculating a coefficient which converts the coordinate value from the camera coordinate system to the robot coordinate system, are necessary, and such calibrations are often mistakable and not easy to understand. According to this embodiment, the TCP definition 81 like the camera TCP is prepared, and by utilizing the TCP definition 81 not only for the movement of the work tool 4 but also for the point teaching, simplification of the manipulation and easiness to understand are realizable.

Second Embodiment

[Structure]

Figure 14:
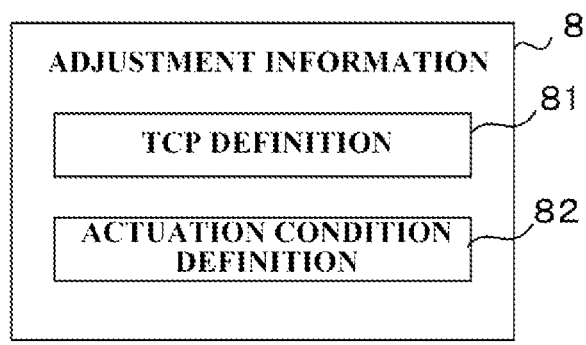
FIG. 14 is a block diagram illustrating adjustment information containing a PTP actuation condition definition.

This embodiment basically employs the same structure as that of the first embodiment. In this embodiment, however, as illustrated in FIG. 14, an actuation condition definition 82 which is the adjustment information 8 indicating how to actuate the work tool 4 is set. In this case, the actuation condition definition 82 indicates the movement of the work tool 4 between the points, i.e., how the work tool 4 moves in the Point-To-Point (PTP) actuation. Example actuation condition definitions 82 are basic parameters, such as a speed, and an acceleration level. In addition, the actuation condition definition 82 contains an arching motion designation, etc.

The arching motion designation designates a movement while changing the height and the direction during the movement, not a simple, linear and horizontal movement of the work tool 4. For example, the arching motion designation designates, in order to go over an obstacle between adjoining points, to once move the moving unit 2 in the height direction, horizontally move the moving unit 2 up to the location above the next point, and to move down the moving unit 2 toward the point.

Figure 15:
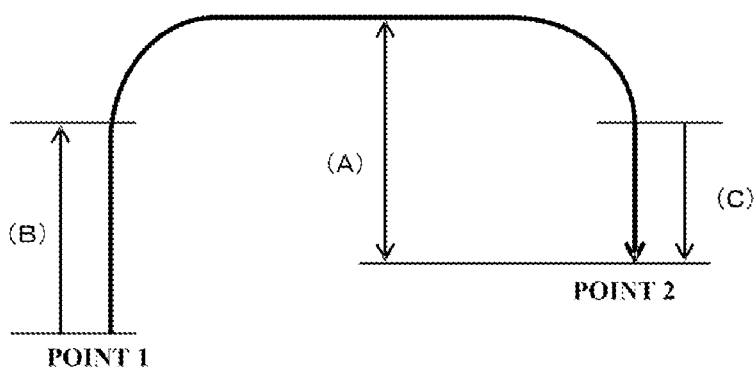
FIG. 15 is an explanatory diagram illustrating an arching motion.

FIG. 15 illustrates an example case in which the work tool 4 is moved from a point 1 to a point 2 by a designated arching motion. First, the work tool 4 is moved up by a predetermined distance from the point 1 that is the start point. Next, after moved up by the predetermined distance while moved horizontally, the work tool 4 is moved down to the point 2 that is the end point. The location where the work tool 4 is moved up or down while being moved horizontally forms a circular arc trajectory. Still further, the work tool 4 is moved down by a predetermined distance, and is stopped at the end point.

In this case, the arching motion designation becomes as follow:

(A) Z-movement height: a distance in the Z-axis direction from either the higher position of the start point and the end point to the horizontal movement position;

(B) Z-only move-up distance: a distance for moving up without a horizontal movement (movement in X and Y axis directions);

(C) Z-only move-down direction: a distance for moving down without a horizontal movement (movement in X and Y axis directions).

When, for example, none of (B), (C) is set but only (A) is set, the start point and the endpoint are at the same height, and the work tool 4 is moved up to the Z-movement height, and is further moved so as to draw an circular arc trajectory.

FIG. 16 illustrates the example actuation condition definition 82. In this example, an actuation condition is defined for a soldering work by a soldering iron. Identification information 82a specifies and identifies an actuation condition. This identification information 82a is reference information set in the point kind definition 7 to be explained later, thereby causing the actuation condition definition 82 to be referred.

The owner 82b, and the protection mode 82c are the same as above. A PTP condition name 82d is a name set to be used in display. This name is prepared in different languages, such as Japanese and English etc., and the displayed name is changed in accordance with a change in display language, thereby facilitating understanding.

An actuation condition 82e is a value that indicates the above moving distance as the actuation condition for the work tool 4. For example, as explained above, the Z-movement height, the Z-only move-up distance, and the Z-only move-down distance are described as the actuation condition 82e.

FIG. 17 illustrates an example point kind definition 7 that refers to such an actuation condition definition 82. This point kind definition 7 is for a dot soldering point and a cleaning point. This point kind definition 7 is basically the same as above. However, this point kind definition 7 has a difference that is a reference PTP actuation condition 79 set in the point kind definition 7.

The identification information on the actuation condition definition 82 to be referred is set in the reference PTP actuation condition 79. In the example case in FIG. 17, SolderingPTPID that is a point kind for the dot soldering point is set, and CleaningPTPID that is a point kind for the cleaning point is set. The dot soldering point is a location where a work that is dot soldering is performed for each point by the work tool 4 that is a soldering iron. The cleaning point is a location where a work that eliminates unnecessary solder and particles by, for example, blowing air to the iron tip.

Note that in FIG. 16, the memory area for each actuation condition 82e is directly set in the actuation condition definition 82. However, a structure in which another memory area for the actuation condition 82e may be provided and referred is also applicable. In this case, the actuation condition 82e is handled as the adjustment information 8, and the identification information which identifies each actuation condition 82e, and which is to be referred by the actuation condition definition 82, etc., is handled as the reference information.

[Action]

A control to which the PIP actuation condition is applied according to this embodiment will be explained.

(Point Teaching)

First, a point teaching according to this embodiment will be explained. The explanation for the same process as that of the above embodiment will be omitted. As a preparation for point teaching, the manipulating user defines, using the manipulation device 35, the actuation condition definition 82, such as "movement between solders", "cleaning" as illustrated in FIG. 16, beforehand. That is, like the above TCP definition 81, with the identification information being designated, the owner, the protection mode, the name to be displayed, and an arching motion designation value are set, thereby creating the actuation condition definition 82.

Next, in the point kind definition 7, the reference PTP actuation condition 79 that has the point kind corresponding to the work tool 4 utilized for work is selected and set. That is, the point kind definition 7 is interlinked with the actuation condition definition 82. For example, the identification information on the actuation condition definition 82 is set as the reference PTP actuation condition 79.

An example point teaching using the PTP actuation condition definition 82 interlinked with the point kind definition 7 will be explained with reference to FIGS. 14 to 17, and further a point sequence illustrated in FIGS. 18, 19.

FIG. 18 is for an example case in which dot soldering is performed at the points that have respective point numbers 1 to 4, and cleaning is performed on the tip of the soldering iron at the point that has the point number 5. In this case, in the actuation condition definition 82 that corresponds to a dot soldering point, since there is no obstacle for a movement between dot soldering points, for the purpose of tact reduction, the designation for the Z-movement height is reduced to 5 mm. Conversely, in the case of cleaning, since a movement to the cleaning location is necessary, the value of the Z-movement height is slightly increased to 50 mm.

As for the movement between dot soldering points and the cleaning, respective PTP actuation conditions may be set, and actuation condition numbers 66 that are 1, 2 may be given. For example, the actuation condition number 66 that is 1 indicates an actuation condition with the Z-movement height which is 5 mm, and the actuation condition number 66 that is 2 indicates an actuation condition with the Z-movement height which is 50 mm. In this case, as illustrated in FIG. 19, the actuation condition number 66 that is 1 is designated for each point which has the point number 1 to 4, and the actuation condition number 66 that is 2 is given to the point which has the point number that is 5, thereby designating the actuation condition as the attribute of the point.

In addition, the actuation condition may be set in a program in the main program 5 or the point kind definition 7. In addition, a commonly applicable actuation condition may be additionally prepared, and when there is no setting for the actuation condition, the common actuation condition may be referred.

(Movement of Work Tool)

In the operation executed by the executing unit 3a based on the point sequence set as explained above, when there is the actuation condition number 66 set for the point, the movement is executed based on this actuation condition number 66.

When there is no actuation condition number 66, the referring unit 3b refers to the reference PTP actuation condition 79 in the point kind definition 7, and the work tool 4 is moved in accordance with this actuation condition. For example, as illustrated in FIG. 18, no actuation condition number 66 is set in the point statement 61 that has the point number which is 1. In addition, the identification information of SolderingPTPID that is the reference PTP actuation condition 79 is set in the point kind definition 7 for the dot soldering point set in the point kind 63.

Hence, the drive condition definition 82 of SolderingPTPID is referred. The soldering iron is moved through an arching motion in accordance with the actuation condition 82e set for this SolderingPTPID.

When there is no actuation condition number 66 set for the point, and no reference PTP actuation condition 79 is set in the point kind definition 7, the movement is executed in accordance with the actuation condition in the program setting or in the common setting.

[Effect]

According to this embodiment, definition of the "PTP actuation condition" is enabled like the "TCP definition", and is interlinked with the actuation condition definition 82 in the point kind definition 7. Hence, in point teaching, it is sufficient that the point kind is simply set for the point kind 63 of each point number 1 to 5. As illustrated in FIG. 19, it becomes unnecessary to explicitly designate the attribute of each point in the point sequence by the actuation condition number 66. Hence, teaching is simplified, and the possibility of error occurrence is reduced.

Third Embodiment

[Structure]

Figures 20, 21:
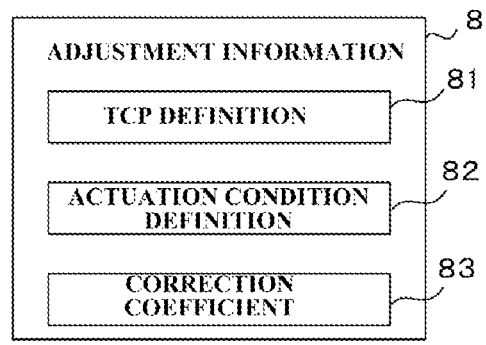
FIG. 20 is a block diagram illustrating the adjustment information containing a correction coefficient.
FIG. 21 is an exemplary diagram illustrating the entire structure of the point sequence that has settings for a work-piece correction number and a camera-imaging-result storing number.

This embodiment basically employs the same structure as that of the above first embodiment. In this embodiment, however, as illustrated in FIG. 20, the adjustment information 8 contains a correction coefficient 83. The correction coefficient 83 is applied to correct the position of the work-piece.

The controller 3 measures multiple positions and heights of the work-piece by image recognition based on a picked-up image by the camera 4a or by the height sensor 4c, and for each work-piece, the point having undergone the teaching is corrected to perform a work.

When, for example, there is a plurality of different work-pieces, plural correction amounts corresponding to the respective work-pieces may be obtained as a set of correction coefficients. In this case, when a correction is necessary, whether or not to apply the correction coefficient is designated for each point.

That is, as illustrated in FIG. 21, an attribute that is a work-piece correction number 67 is added to each point in the point sequence, thereby explicitly designating whether or not to perform position correction. The work-piece correction number 67 corresponds to a camera-imaging-result storing number 68 that indicates an area where the plurality of correction coefficients is stored.

The point sequence in FIG. 21 is for an example case in which a work of picking up the image of the work-piece by the camera 4a, calculating a position correction amount, and performing dot application, is repeated. For example, the camera imaging is performed at the point number 1. The changeover TCP number that is 1 is designated for this point, thereby explicitly indicating that the TCP value of the camera 4a is applied.

In addition, by designating the camera-imaging-result storing number 68 that is 1, an instruction to store a work-piece correction coefficient that is a result of camera imaging in the storing area with the designated number that is 1 by the work-piece correction number 67 is given. In addition, in a dot application at the point number 2, since the work-piece correction number 67 is 1, the position of the work-piece is corrected using the correction coefficient stored in the storing area with the designated number that is 1.

When, however, there is only one work-piece or are a plurality of work-pieces in which a measurement and a work are alternately performed, it is unnecessary to register a plurality of correction coefficients. In addition, a designation scheme using the work-piece correction number 67 and the camera-imaging-result storing number 68 is complicated.

However, a distinction as to whether or not it is a point to which the position correction is applied for the work-piece is necessary. In this embodiment, as illustrated in FIG. 22, the reference information including a work-piece position correction 80 and indicating whether or not it is a point to which the position correction is applied is set in the point kind definition 7.

In the case of, for example, a non-general work-piece, no position correction is applied to this work-piece, and in the case of a general work-piece, the position correction is applied to this work-piece. In this case, when the "camera imaging point" in the point kind definition 7 is not for the general work-piece, a setting "NO" is designated in the work-piece position correction 80. When the "dot application" is for the general work-piece, a setting "YES" is designated in the work-piece position correction 80. Other details of the point kind definition 7 are the same as those of the above embodiments, and thus the duplicated explanation thereof will be omitted.

[Action]

(Point Teaching)

According to the embodiment explained above, by setting the point kind definition so as to indicate whether or not a position correction is performed, it becomes unnecessary to set the work-piece correction number 67 in point teaching. For example, as is indicated by the point sequence in FIG. 23, no "camera-imaging-result storing number" is designated at the camera imaging point that has the point number which is 1. Conversely, no "work-piece correction number" is designated at the dot application point that has the point number which is 2.

Conversely, a setting "NO" is designated in the work-piece position correction 80 at the "camera imaging point" in the point kind definition 7. In addition, a setting "YES" is designated in the work-piece position correction 80 at the "dot application point".

(Movement of Work Tool)

When the operation is executed by the executing unit 3a based on the point sequence set as explained above, when the point in the point sequence is added with the work-piece correction number 67, the position correction is performed on the work-piece based on this work-piece correction number 67.

When no work-piece correction number 67 is added, the referring unit 3b refers to the setting of the work-piece position correction 80 in the point kind definition 7. No work-piece correction number 67 and camera-imaging-result storing number 68 is designated at the camera imaging point, and a setting "NO" is designated for the work-piece position correction 80 in the point kind definition 7. In such a case, it is implicitly designated that no correction is performed but the storing area in the storage 32 where the correction coefficient 83 is stored is utilized at the next dot application point.

Next, no work-piece correction number 67 and camera-imaging-result storing number 68 is designated at the dot application point that has the point number which is 2. In such a case, the referring unit 3b refers to the setting of the work-piece position correction 80 in the point kind definition 7. A setting "YES" is designated in the work-piece position correction 80 at the dot application point. In such a case, the position correction is performed on the work-piece using the work-piece correction coefficient stored in the common area in the storage 32.

When there is the work-piece correction number 67 for each point, this setting is preferentially applied. Hence, when a plurality of work-piece correction coefficients is necessary, it is sufficient if designated by the work-piece correction number 67.

[Effect]

As explained above, by setting the point kind definition 7 so as to indicate whether or not to perform a correction, when it is sufficient if the number of work-piece correction coefficients is one, no setting of work-piece correction number 67 and camera-imaging-result storing number 68 is necessary, and thus the manipulation is simplified.

In addition, by designating, in the point kind definition 7, that the work-piece on which a work is performed is not the general work-piece, a setting that no position correction is performed on the work-piece at this point is automatically designated.

Fourth Embodiment

In the point kind definition 7 according to the above embodiments, not only the basic point kind but also a defined point kind are applicable to the "source point kind information". That is, a so-called a "class inheritance". In this case, as for the setting of the reference TCP, the reference PTP actuation condition, or the work-piece correction, information described in the point kind definition 7 that is a source of the inheritance may be inherited.

Hence, in this embodiment, setting of a condition for the inheritance of the point kind definition 7 is enabled. When, for example, the point kind definition 7 that is a source of the inheritance is a basic kind, as for the setting of the reference TCP 76 in the point kind definition 7, the following three selectable choices are given. The same is true of the reference PTP actuation condition 79, and the work-piece correction 80:

(1) Inherit the setting of the basic kind;
(2) Do not inherit the setting of the basic kind; and
(3) Designate a particular TCP value.

When the setting (1) "inherit the setting of the basic kind" is selected, the TCP definition 81 of the reference TCP 76 added to the point kind definition 7 set in the "source point kind definition" is inherited. That is, an offset by the TCP value 81e in the TCP definition 81 is applied.

When the setting (2) "do not inherit the setting of the basic kind" is selected, information is handled that no reference TCP 76 is added. That is, the reference TCP 76 in the point kind definition 7 to be inherited is not utilized.

When the setting (3) designate a particular TCP value" is selected, the designated TCP value is referred.

When, for example, the camera imaging point (CameraTaking) is designated as the "source point kind information", and the point kind set in (1) "inherit the setting of the basic kind" is newly defined. In this case, CameraTCP set in the source of the inheritance is referred for this point.

Fifth Embodiment

As explained above, when the protection mode for the point kind definition 7 is set as "protected", only the utilization right is given and a reference to the details is prohibited. However, without a reference right, it is unknown what settings, such as the reference TCP and the reference TCP actuation condition, are designated. In addition, when settings for these values are executed based on the TCP definition 81 and the actuation condition definition 82, it is still unknown which point kind definition 7 those values are referred.

In this embodiment, even if the reference right is not given, the display unit 352 displays a list indicating which point kind definition the adjustment information 8 is referred. For example, as illustrated in FIG. 24, a list of point kind definitions 7 to which the TCP definition 81 and the actuation condition definition 82 are referred is displayed.

Hence, the manipulating user is capable of knowing to which adjustment information 8 the point kind definition 7 refers, and to which point kind definition 7 the adjustment information 8 is referred, and thus the manipulating user is capable of understanding, in detail, what action is performed in the operation.

In particular, when the point kind definition is designated by an inheritance, and the reference TCP 76 and the reference TCP actuation condition 79, etc., are to be inherited, it becomes unnecessary to trace what reference is to be performed in the operation from the definition as a result, and thus it is convenient for the manipulating user.

Other Embodiments

The embodiments of the present invention have been explained above, but various omissions, replacements, and changes can be made thereto without departing from the scope of the present invention. Such embodiments and modified examples thereof are within the scope and spirit of the present invention, and are also within the scope of the invention as recited in appended claims and the equivalent range thereto.

The adjustment information in the above embodiments, such as the TCP definition, the TCP value, the actuation condition definition, the actuation condition, and the correction coefficient, may be applied alone or in combination with others.

In addition, the explanation has been given of an example case in which the programming to the robot 1 is directly performed on the robot 1, but the present invention is not limited to this case. For example, the programming may be carried out by a programming tool that is a different computer, etc., from the robot 1, and the programs may be loaded in the robot 1.

What is claimed is:

1. A robot comprising:
   a plurality of work tools performing a work on a point on a work-piece;
   a moving unit moving the plurality of work tools to the point; and
   a controller controlling the work tool and the moving unit in accordance with a main program,
   wherein the controller comprises:
      a main program memory storing the main program;
      a point sequence memory storing a point sequence comprising statements arranged in sequence for each point, each statement containing kind information identifying control details to the work tool, and coordinate information on the point;
      a point kind definition memory storing a point kind definition describing the control details identified by the kind information, the point kind definition containing reference information to refer adjustment information for each of the work tools;

an adjustment information memory storing the adjustment information prepared for each of the work tools corresponding to the reference information;

an executing unit executing the main program in accordance with the point sequence; and a referring unit applying the adjustment information to the control details by referring the adjustment information when the point kind definition contained in the point sequence is inherited during the execution by the executing unit.

2. The robot according to claim 1, wherein the adjustment information contains a tool position definition containing offset information for each of the work tools relative to a same coordinate on the work-piece.

3. The robot according to claim 2, further comprising:

a display unit displaying a list of names of the plurality of tool position definitions when a position of the point in the point sequence is detected;

a selecting unit selecting any tool position definition in accordance with the work tool from the list displayed on the display; and an adjusting unit applying the offset information set by the selected tool position definition when the detected position of the point is registered in the point sequence.

4. The robot according to claim 3, further comprising a registering unit registering, as a coordinate of the point in the point sequence, when the selecting unit selects the tool position definition corresponding to the work tool that is a camera, a value obtained by applying an offset to the detected coordinate by the camera based on the offset information.

5. The robot according to a claim 1, wherein the adjustment information contains an actuation condition definition defining an actuation condition indicating how each of the work tools is actuated.

6. The robot according to claim 1, wherein the adjustment information contains correction information for correcting a position of the work-piece.

7. The robot according to claim 1, wherein the point kind definition contains a first information indicating that another point kind definition is inherited, and a second information indicating that the reference information contained in the inherited point kind definition is also inherited.

8. The robot according to claim 1, further comprising a display unit displaying a list of the point kind definitions referring the adjustment information.

\* \* \* \* \*